Nov. 14, 1933.  O. A. CAVINS  1,935,078
MAGNETIC ORIENTER FOR WELL CORE BARRELS
Filed Aug. 31, 1927

Inventor
Omar A. Cavins
By Lyon & Lyon
Attorneys

Patented Nov. 14, 1933

1,935,078

UNITED STATES PATENT OFFICE 1,935,078

MAGNETIC ORIENTER FOR WELL CORE BARRELS

Omar A. Cavins, Glendale, Calif., assignor to Standard Oil Company of California, San Francisco, Calif., a corporation of Delaware Application August 31, 1927. Serial No. 216,544

14 Claims. (Cl. 33—205)

This invention relates to magnetic orienters for oil well core barrels, and is more particularly related to a magnetic orienting device adapted for use in connection with core barrels or similar sample taking devices, such as are employed for the purpose of taking samples from holes drilled in the earth for the purpose of ascertaining the presence of minerals, hydrocarbon oils, gases or the like. In the taking of samples or cores in the drilling of wells such, for example, as gas and oil wells, or the like, it is desirable to know on the withdrawal of the core the true direction of the dip and strike of the underground structure as indicated thereby.

It is, therefore, an object of this invention to provide a magnetic orienting device adapted for use in connection with sample taking mechanism or core barrels employing a magnetic compass mounted in the drill stem or string which supports or by which the sample taking device is suspended within the hole being formed and which magnetic compass includes a movable bearing support and means actuated by the sample taking device during the taking of the said sample for actuating the bearing support to permit the compass arm to be freely pivotally supported, and means adapted to be actuated after the compass arm has come to rest for clamping the compass arm in this position.

Another object of this invention is to provide a magnetic orienting device adapted for use in connection with sample taking devices, core barrels, or the like, including a magnetic compass mounted within a non-magnetic housing within the drill stem by which the sample taking device is suspended within the hole, and means by which the compass arm or needle is released so that the same can swing to assume its correct orienting position when the sample taking device is being or has been used, and for clamping the compass arm or needle in position after the same has come to rest, which means include means for slowly actuating the bearing support upon which the compass arm is pivotally supported, and means for quickly actuating the bearing support in the reverse directio to clamp the needle or arm in the exact position at which the same has come to rest.

Other objects and advantages of this invention, it is believed, will be apparent from the following detailed description of a preferred embodiment thereof, as illustrated in the accompanying drawing:

Figures 1, 2, 3:
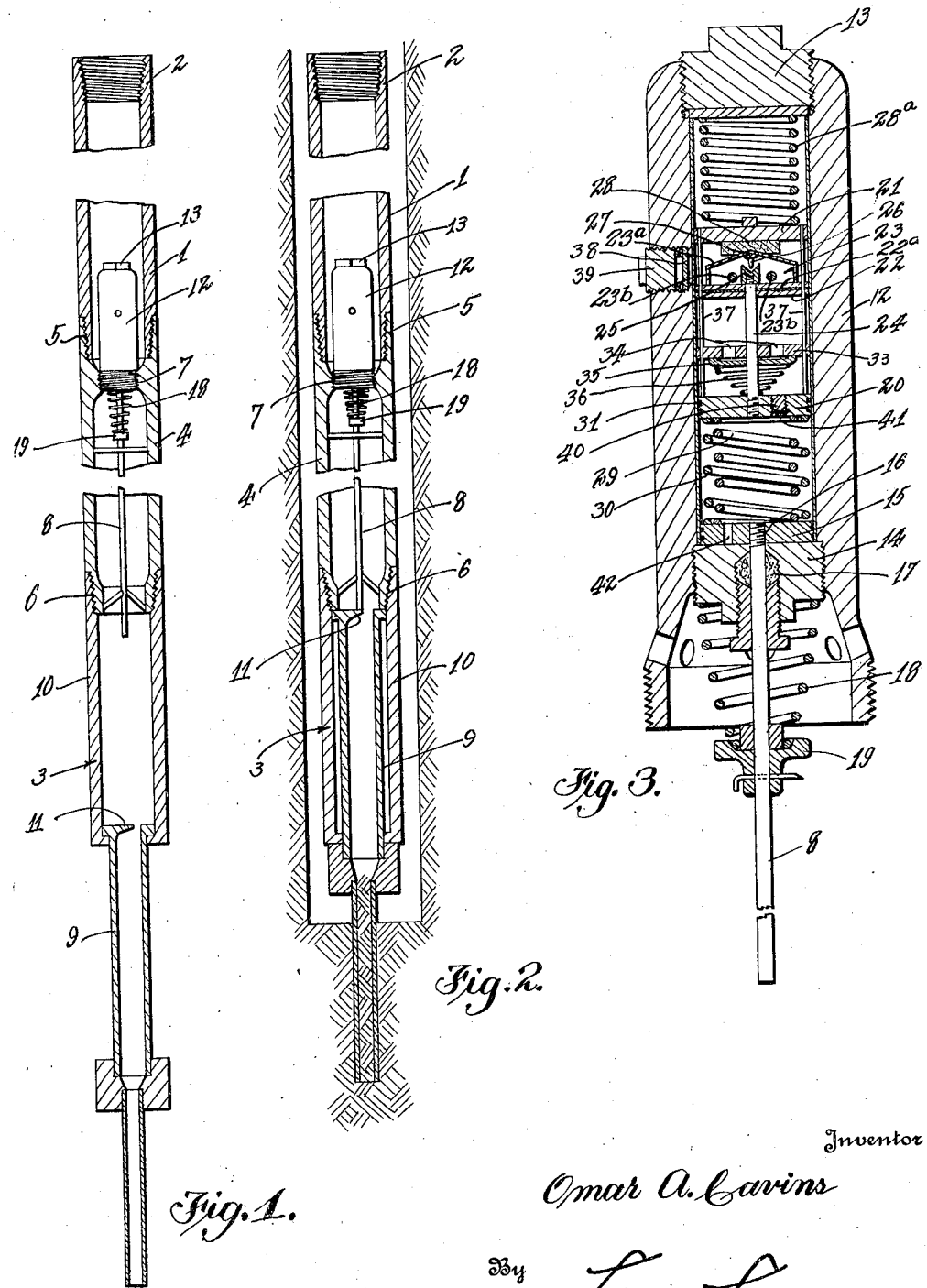
Figure 1 is a side elevation of a sample taking device illustrating a magnetic orienting device embodying this invention, as adapted thereto.
Figure 2 is a similar sectional side elevation illustrating the sample taking device as actuated to actuate the magnetic orienting device embodying this invention.
Figure 3 is an enlarged sectional view mainly in vertical mid-section of a magnetic core orienting device embodying this invention. In this view the orienting device is shown with the compass in its clamped or locked position, the support therefor being withdrawn from the pivot of the compass.

In the preferred embodiment of this invention, illustrated in the accompanying drawing, 1 illustrates a sub or connector of non-magnetic material which is secured at its upper end at the threads 2 to the drill stem or pipe by means of which the sample taking device 3 is suspended within the hole or well being formed. Mounted between the sub 1 and sample taking device 3 is a connecting member 4 which is likewise of a non-magnetic material and which is secured at the threads 5 to the sub 1 and at the threads 6 to the sample taking device 3.

The magnetic orienting device embodying this invention is secured as illustrated at the threads 7 within the connecting device 4 and a reach rod 8 connected with the magnetic orienting device extends substantially axially of the connecting member 4 into the sample taking device 3 so that when the inner tube 9 thereof is telescoped within the outer tube 10, the end 11 of the inner tube engages the reach rod 8 to actuate the magnetic orienter in a manner that will hereinafter be described. Any other suitable or desirable form of sample taking device may be employed in place of the sample taking device 3 such, for example, as a rotary core barrel or the like, such as are commonly employed in the taking of samples in oil, gas and like wells. If a rotary core barrel is used, it will necessitate the employment of another form of trip means to take the place of the reach rod 8 which may be actuated upon the rotation of the rotary core drill or upon admission of the flushing fluid through the rotary core barrel in a manner as is well understood in the art.

The magnetic orienting device preferably is constructed as follows:

A shell or body 12 is provided which is capped at its upper and lower ends by plugs 13 and 14, respectively. The lower end of the body 12 is flanged outwardly and provided with screw-threads by means of which the same may be secured in position in the connecting member 4. Mounted within the body 12 is a plunger 15 which is secured to the reach rod 8, as illustrated at 16. The reach rod 8 extends through a packing gland 17 mounted in the plug 14. Mounted on the reach rod 8 is a compression spring 18 which engages the plug 14 at its upper end and a stop member 19 secured to the reach rod 8 at its lower end.

Above the plunger 15 are separate plungers 20 and 21. Below the plunger 21 and between the plunger 21 and plunger 20 is a fixed partition 22 adapted to support a magnetic compass assembly 23. The plate or partition 22 may be attached to the body 12 or to a liner or sleeve within the body portion 12, said sleeve being held from rotation or longitudinal movement within the body 12 by the plugs 13 and 14. The partition 22 may be made of a plurality of plates including a gasket 22a adapted to prevent liquid from entering that portion of the device above the partition 22. Secured to the movable plunger 20 is a rod 24 which, passing through plates 22 as shown has, at its upper end, a bearing member 25 upon which the pivot 26 of the compass assembly may be supported and the magnetic compass assembly raised above the plates 22. The compass assembly 23 may consist of a saucer-shaped non-magnetic shell 23a through which pass two parallel magnetized steel rods 23b. The pivot 26 is attached to the inside of the inverted shell at its center by a boss 27. The whole compass assembly is accurately balanced so as to turn easily upon the pivot 26. The external periphery of the compass shell may be suitably graduated, for instance from 0 to 360 degrees, so that its position may be determined with regard to the body 12 through the observing glass 38, as is described hereinafter. Secured to the under face of the plunger 21 is a cushion of fabric or like material 28, which normally engages the compass assembly 23 and holds the same firmly in position against rotation on the plate 22. A spring 28a is provided intermediate the plunger 21 and the plug 13 which yieldably urges the cushion 28 against the compass assembly 23. Mounted between the plungers 15 and 20 are cylindrical compression springs 29 and 30 which transmit upward movement of the plunger 15 to plunger 20, the upward movement of which first releases the compass assembly 23 by raising the plunger 21, with cushion 28, by means of the legs 37 and then raises the compass assembly 23 by pushing the pivot 26 upward on the bearing member 25. The legs 37 are firmly connected to plunger 21 and pass through suitable perforations in partitions 22 and 33, the lower ends of the legs 37 normally resting freely upon plunger 20.

The plunger 20 is preferably provided with a compression ring 31. Mounted within the chamber formed between the plates 33 and the plunger 20 is glycerine or a like liquid which acts to prevent the rapid movement of the plungers 20 and 21 upwardly when the reach rod 8 is actuated by the sample taking device. The stop 19 on the reach rod 8 provides a limit means in which the reach rod will not be permitted to move vertically.

A plate valve is provided intermediate the plunger 20 and plate or partition 22 and is preferably constructed of a plate 33 having bores 34 formed therethrough. The plate 33 is stationary, being attached to the body 12 or to an inner sleeve as is plate 22. Suitable holes are formed in the plate or partition 33 to allow the legs 37 attached to plunger 21 to pass freely therethrough. A plate 35 is journaled on the rod 24 and is yieldably urged toward the plate 33 to close the bores 34 by means of a compression spring 36.

Means are provided for permitting observation of the magnetic compass after the orienting device has been assembled which means preferably comprise a glass 38 which is mounted in an opening formed in the body 12 adjacent the magnetic compass. A plug 39 is screw-threaded in the openings formed to close the same and prevent fluid from leaking into the interior of the magnetic orienting device.

In order to permit the chamber formed between the plunger 20 and plate 33 to be filled with a liquid such, for example, as glycerine, the plunger 20 is provided with a filling opening 40 which is provided with a closure plug 41. Normally, therefore, the device contains a liquid in the space between plunger 20 and partition 33, the magnetic compass resting upon the partition 22 and held from rotation by pressure of the retainer 28 attached to the plunger 21. Furthermore, the compass bearing 25 connected to plunger 20 by means of the rod 24 is not in engagement with the compass pivot 26.

The operation of the magnetic orienting device embodying this invention is:

The sample taking device and magnetic orienting device are lowered into the hole and the sample taking device is actuated to take a sample in the hole and also so as to actuate the reach rod 8 by means of which the magnetic orienting device is actuated. Before use in the hole by test, the proper length of the reach rod 8 is determined. The reach rod 8 being moved vertically, moves the plunger 15 upwardly within the housing or body 12, compressing the springs 29 and 30. The compression of the springs 29 and 30 acts to move the plunger 20 upwardly. Air above the plunger 15 passes downwardly through a hole 42 formed in the plunger 15, permitting free movement of the plunger 15. The plunger 20 is moved vertically by the force imparted to the springs 29 and 30, such motion being slow, due to the slow discharge of the liquid from between the plunger 20 and the plate 33 into the space between the plate 33 and the plates 22 through the small holes through which the legs 37 of the plunger 21 pass. As the plunger 20 moves slowly upwardly, it raises the plunger 21 which has been tightly holding the saucer-shaped compass assembly 23 by means of the fabric pad 28. As the plunger 20 continues to rise after releasing the compass 23, it gently lifts said compass on the compass bearing support 25. The compass being thus raised is free to rotate and come to rest under the effect of the magnetic field if the sample taking device is permitted to remain resting on the bottom of the hole a sufficient length of time. The sample taking device is then lifted to remove the sample from the hole and the reach rod 8 is forced suddenly downward by the spring 18. This quick movement of the reach rod 8 removes all of the compressive force from the springs 29 and 30 and permits the compressed upper spring 28a to freely act suddenly withdrawing the compass bearing support 25 downwardly by means of the action of the plunger 21 on the plunger 20 through the legs 37. This rapid downward movement is permitted by the quick discharge of the liquid from between the plates 22 and 33 into the chamber between the plate 33 and the plunger 20 through the plate valve provided by the plates 33 and 35. By the above described action, the compass bearing support 25 is suddenly withdrawn from the pivot point of the saucer-shaped compass and the compass assembly saucer is instantly clamped on its lower edge to the upper plate 22. When the magnetic orienting device is removed from the hole, the position of the compass can be read through the observing glass 38 by removing the plug 39. The reading on the compass can be applied to the core taken from the core barrel by zero marks placed on the sub and the sample or core taken.

Having fully described my invention, it is to be understood that I do not wish to be limited to the details herein set forth, but my invention is of the full scope of the appended claims.

I claim:

1. In a device of the class described, the combination of a housing, a compass mounted within the housing, a movable bearing support for the compass and normally out of contact therewith, means for actuating the bearing support to raise the same to freely pivotally support the compass, and means for quickly clamping the compass in position.

2. In a device of the class described, the combination of a housing of non-magnetic material, a compass mounted within the housing and including a movable pivot bearing support for the compass and normally out of contact therewith, means for moving the bearing support slowly into position to freely support the compass, and means for quickly moving the bearing support away from the suporting position and for clamping the compass in position.

3. In a device of the class described, the combination of a housing, a compass mounted within the housing, a bearing support for the compass, a plunger mounted within the housing and supporting the bearing support, means for actuating the plunger, means for resisting the free movement of the plunger in one direction to slowly move the bearing support to freely support the compass, and means for quickly actuating the plunger in the reverse direction to clamp the compass in position.

4. In a device of the class described, the combination of a housing of non-magnetic material, a compass mounted within the housing, a movable compass bearing support normally out of contact with the compass, means for slowly moving the bearing support into engagement with the compass to permit the compass to pivot freely in the housing, and spring means for quickly actuating the bearing support to allow the compass to be clamped in position.

5. In a device of the class described, the combination of a housing, a compass mounted within the housing, a bearing support for the compass, releasable means for actuating the bearing support to raise the same into engagement with the compass to permit the compass to freely pivot in the housing, clamping means carried within said housing and above said compass, and means connecting the actuating means and the clamping means so that when the actuating means is released, the clamping means will operate to quickly clamp the compass in position.

6. In a bore hole tester adapted for use in connection with a sampling device, a housing, a compass mounted within the housing and including a movable pivot bearing support for the compass, means within the housing, including a plunger adapted to be operably engaged with the sampling device for moving the bearing support slowly into position to freely support the compass, and means operably connected with the compass bearing support for quickly moving the bearing support away from the supporting means and for clamping the compass in position.

7. A device of the character described, comprising, a housing, a compass within said housing, clamping means for holding the compass in position, a movable bearing support for the compass, an actuating rod, a plunger connected thereto, separate means for translating motion of the plunger to the movable bearing support and from there to the clamping means, and means for impeding the motion of the bearing support and clamping means when the compass is to be freely pivoted and for accelerating the motion of the support and bearing means when the compass is to be restrained.

8. In a device of the character described, the combination of a housing of non-magnetic material, a substantially immovable partition in said housing, a compass positioned on said partition, clamping means for holding the compass in position on said partition, a plunger within said housing, a compass bearing support connected to said plunger, a second plunger, means for actuating said second plunger, means interposed between said second and first plungers for translating the motion of the second to the first, means for retarding the movement of the first plunger to regulate the speed of motion of the compass bearing support into contact with the compass, means for lifting the clamping means slightly in advance of the compass bearing support and means for quickly clamping the compass in position when means for actuating the second plunger are released.

9. In a device of the class described, the combination of a housing of non-magnetic material, a compass mounted within the housing, an actuating plunger within the housing, an actuating rod secured to said actuating plunger, a partition within said housing upon which said compass may be clamped into position, compass clamping means above said compass and partition, a second plunger between said actuating plunger and partition, a compass bearing support secured to the last named second plunger, means interposed between said second plunger and actuating plunger for imparting motion to said second plunger, means for retarding the action of the second plunger to regulate the speed of motion of the bearing support into position, means for releasing the compass, said means being actuated by the movement of the second plunger.

10. A device of the character described comprising a housing, a compass within said housing, clamping means for holding the compass in position, a movable bearing support for the compass, an actuating rod, a plunger connected thereto, means for translating motion of the plunger to the movable bearing support and means for translating the resultant motion of the movable bearing support to the clamping means, a fluid means cooperating with the plunger for impeding the upward motion of the bearing support and clamping means when the compass is to be freely pivoted, and spring means for accelerating the motion of the bearing support and plunger when the compass is to be restrained.

11. In a device of the character described, the combination of a housing, a compass mounted within the housing, a movable bearing support for the compass, means positioned within the housing and operably connected with said bearing support for actuating the bearing support to raise the same to pivotally freely support the compass, and dash-pot means adapted to retard the movement of the bearing support into compass supporting position, said dash-pot means being operably connected to said bearing support, and means for quickly clamping the compass in position.

12. In a device of the character described, the combination of a housing, a partition in said housing, a compass adapted to be clamped on said partition, clamping means positioned above said partition and compass, a ported actuating plunger within the housing, a second plunger in said housing between said actuating plunger and partition, a compass bearing support carried by said second plunger and extending into said partition, a ported partition in said housing between said second plunger and first named partition, a valve in said ported partition adapted to restrain the flow of fluid from between said ported partition and second plunger and to permit ready flow in the opposite direction, and means for translating motion of said actuating plunger into motion of said second plunger and clamping means.

13. In a device of the class described, the combination of a housing, a compass mounted within the housing, a bearing support for the compass, plunger means for raising the bearing support into engagement with the compass to permit the compass to freely pivot in the housing, a clamping means positioned within the housing above said compass, and means connecting said plunger and clamping means whereby the clamping means will operate to quickly clamp the compass in position when said plunger is lowered.

14. In a device of the character described, a non-magnetic housing, a compass within the housing, clamping means within the housing for holding the compass in fixed position, a movable bearing support for the compass, means positioned within the housing and operably connected to said clamping means and bearing support and adapted to release the clamping means, liquid controlling means adapted to regulate the speed of activation of the bearing support to pivot the compass, spring means for quickly disengaging the bearing support from the compass, and separate spring means for quickly clamping the compass with said clamping means.

OMAR A. CAVINS.